United States Patent [19]

Brentlinger

[11] 4,237,482
[45] Dec. 2, 1980

[54] DISPLAY SYSTEM FOR ACHIEVING AESTHETICALLY PLEASING LISSAJOUS PATTERNS FROM A SINGLE SOURCE OF SIGNALS

[76] Inventor: Brent R. Brentlinger, 1645 E. Thomas Rd., Apt. 409, Phoenix, Ariz. 85016

[21] Appl. No.: 965,570

[22] Filed: Dec. 1, 1978

[51] Int. Cl.³ .............................................. H04N 9/02
[52] U.S. Cl. ..................................................... 358/81
[58] Field of Search ...................... 358/81, 82; 84/464; 179/1 SP

[56] References Cited

U.S. PATENT DOCUMENTS

| | | | |
|---|---|---|---|
| 3,627,912 | 12/1971 | Hearn | 358/82 |
| 3,940,789 | 2/1976 | Kratz et al. | 358/82 |

Primary Examiner—Robert L. Richardson
Attorney, Agent, or Firm—James F. Duffy

[57] ABSTRACT

A CRT system uses a time delay element in one deflection circuit to enable the production of reentrant Lissajous figures from signals derived from a single source. Its high voltage power supply operates at frequencies beyond the audio range and produces wave forms of low harmonic content at relatively low voltage levels thus providing quiet operation with little or no electromagnetic interference or x-ray emission problems. A secondary deflection yoke acting on the beam before the beam enters the effective region of the primary sweep deflection yoke enables control of the color tone of the image presented. Individual gain and timing controls produce variations in the display to satisfy the whim of the viewer. A gate-controlled blanking signal produces a stroboscopic effect at the display while a second form of intensity modulation produces scintillation of the displayed imagery. A master panel control enables the viewer to command a display of infinite variety and hue to satisfy the most demanding aesthetic sensibilities.

19 Claims, 3 Drawing Figures

DISPLAY SYSTEM FOR ACHIEVING AESTHETICALLY PLEASING LISSAJOUS PATTERNS FROM A SINGLE SOURCE OF SIGNALS

The invention relates to a system for the production of Lissajous figures on a cathode ray tube (CRT).

More particularly, the invention is related to a system for producing Lissajous patterns on a CRT of signals produced by a single signal source.

Even more particularly, the invention is related to the production of Lissajous figures from a single signal-source by the use of a time delay, as opposed to a phase delay, element inserted into the conduction path between said signal source and one of the deflection circuits of said CRT.

Even more specifically, the invention relates to a visual display of Lissajous patterns made aesthetically pleasing by the incorporation of strobe and scintillation effects in the CRT imagery.

Of particular relevance is the use of the invention with multi electron-gun, multi color phosphor CRT's wherein the Lissajous patterns formed are made strikingly pleasing by controlling pattern color between pure hue and multi-color effects, by scintillation effects, by pseudostrobe light effects which are controlled both in frequency of the strobe and the duration of each strobe pulse, and by controlled variation of the time delay incorporated between said single of signals and one of said deflection circuits of said CRT.

Prior art is replete with examples of attempts to produce aesthetically pleasing light displays in association with varying signals derived from such sources as voice and musical instrumentation. Frequently referred to as "light organs", such devices often made use of frequency sensitive elements to cause a coruscating display from a light board containing upwards of a hundred small bulbs. In others, lights were arranged behind a rainbow array of lenses, a given light bulb lighting when signals of a certain frequency caused it to be energized. While the effects of these devices are at first pleasing, the repetitiousness of the display rapidly causes the viewer to loose interest.

In commercial establishments where dancing is provided for entertainment, stroboscopic light effects and laser lightshows are often held to the accompaniment of dance music for the entertainment of the customers. The light organs tended to be cumbersome and somewhat boring, while the stroboscopic and laser light devices were generally priced beyond the reach of the home entertainment market. Some recent efforts have been used to provide reasonably priced light display devices which utilize cathode ray tubes.

A significant amount of effort has been applied by prior workers in the field of visual displays to achieving an aesthetically satisfying light display on a CRT. Most of these devices are technically involved and would appear to be rather expensive. See Kratz et al, U.S. Pat. No. 3,940,789, issued Feb. 24, 1976, and the cases cited therein during the prosecution of that Patent. In comparison to the cases cited therein, the Kratz disclosure itself is a significant step toward achieving a light display on a cathode ray tube in a relatively simple, straightforward manner. There are some apparent drawbacks to his approach, however. He's limited to using two distinct signal sources which are claimed alternately as "two stereophonic electrical signals", "two random electrical signals", or "two random, non-periodic information signals". His approach requires that the CRT deflection yoke be moved far back from its normal position which precludes his achieving a pure-hued image on the CRT screen. His display produces variegated color patterns. To assure such variegation, he energizes a standard degaussing coil employing a one hundred fifteen volt AC source for that purpose. It would seem that there would be a significant amount of energy loss in the form of heat when a standard degaussing coil is so energized.

In a co-pending patent application of even date filed by the inventor herein, Ser. No. 965,569, a simple method for obtaining a visual display on a CRT from a signal generated by a single source is disclosed. While that application discusses a simple, basic time delay approach to the development of Lissajous figures from a signal from a single source, and while suggestions are made for various applications of the teachings revealed there, a complete display system having controls to vary the aesthetic effects of the display was not disclosed.

It is an object of the present invention to provide a CRT visual display system economical enough to be used for home entertainment.

It is a further object of the invention to provide a CRT display system which will provide aesthetically pleasing Lissajous figures derived from a single source of signals.

Another object of the invention is to provide a visually pleasing Lissajous pattern display which may be presented in pure color tones.

It is a further objective of the invention to provide a Lissajous pattern display the color tones of which may be controlled so as to both produce primary and secondary hues for multi-color effects.

Another object of the invention, in multi electron-gun CRT's, is the ability to control at least one of the Lissajous patterns produced by said electron-guns so that the visual impression formed of the image on the CRT scope is distinctly different from that formed by the remaining electron-guns.

Another object of the invention is to produce a cathode ray visual display system which presents no x-ray emission danger and exhibits little, if any, electromagnetic interference (EMI) characteristics.

A very specific objective of the invention is to provide a visual display system utilizing the time delay approach to the formation of Lissajous patterns disclosed contemporaneously herewith by the inventor as noted above.

In summary description, the invention is a CRT display system using a time delay element in one deflection circuit enabling the production of reentrant Lissajous figures from signals derived from a single source. In the embodiment disclosed the CRT is the familiar three electron-gun, three-color phosphor screen, standard with today's color T.V. sets.

Unlike a T.V. set, the invention has a simpler, less expensive, high voltage power supply operating beyond the audio range, with waveforms of low harmonic content and at lower voltage levels. The result is no annoying audible squeel from the flyback transformer, and little or no x-ray emission or EMI. Thus, dangers to young persons, having a tendency to view the display from extremely close distances, are obviated. Also, because of the low EMI, signal sources whose performances are typically impaired by interferring emissions from a T.V. set, may be used with the invention; this includes, of course, A.M. radio receivers.

The CRT is provided with a second, smaller, special effects deflection yoke emplaced away from the screen, just beyond the standard deflection yoke, the standard deflection yoke being located in its normal operating position. The special effects deflection yoke is hereinafter referred to as a "hue control". The yoke is selectively energized from ac and dc sources of low voltage potentials (approximately 6-10 v) and low current drain (approximately 70-100 ma per yoke coil). When the hue control is energized with dc, the color tone of the Lissajous figures may be established to suit the viewer's tastes. When the hue control is energized with ac, the effect on any one electron beam is to cause that beam to produce a multiplicity of patterns each in its own color tone and each of a different line width giving the viewer the impression of a multi-color, 3-D presentation.

Individual gain and timing controls produce variations in the display to satisfy the whim of the viewer.

Application of a gate-controlled blanking signal to the beam produces a pseudostroboscopic effect at the display. Both the frequency of application of the blanking signals and its duration (i.e. both repetition rate and duty cycle) may be controllably varied for the effect desired. Strobing affects the shape of the Lissajous figure perceived, and thus adds greater variety to the presentation.

A sample of the voltage waveform in the secondary of the flyback transformer, applied as intensity modulation to the beams, produces scintillation of the imagery displayed. Some control of the sampled waveshape is available by modification of the operating characteristics of the sawtooth generator in the power supply.

The intensity controls perform a multi-function role, permitting the viewer to meld and control strobe, scintillation, and intensity effects displayed on the CRT screen. With all controls brought to a master control panel, the viewer has but to command a display of infinite variety and hue to satisfy the most demanding aesthetic sensibilities.

The details of the invention are clearly disclosed herein and will be fully understood by those versed in the art when read in conjunction with the figures, in which.

Figure 1:
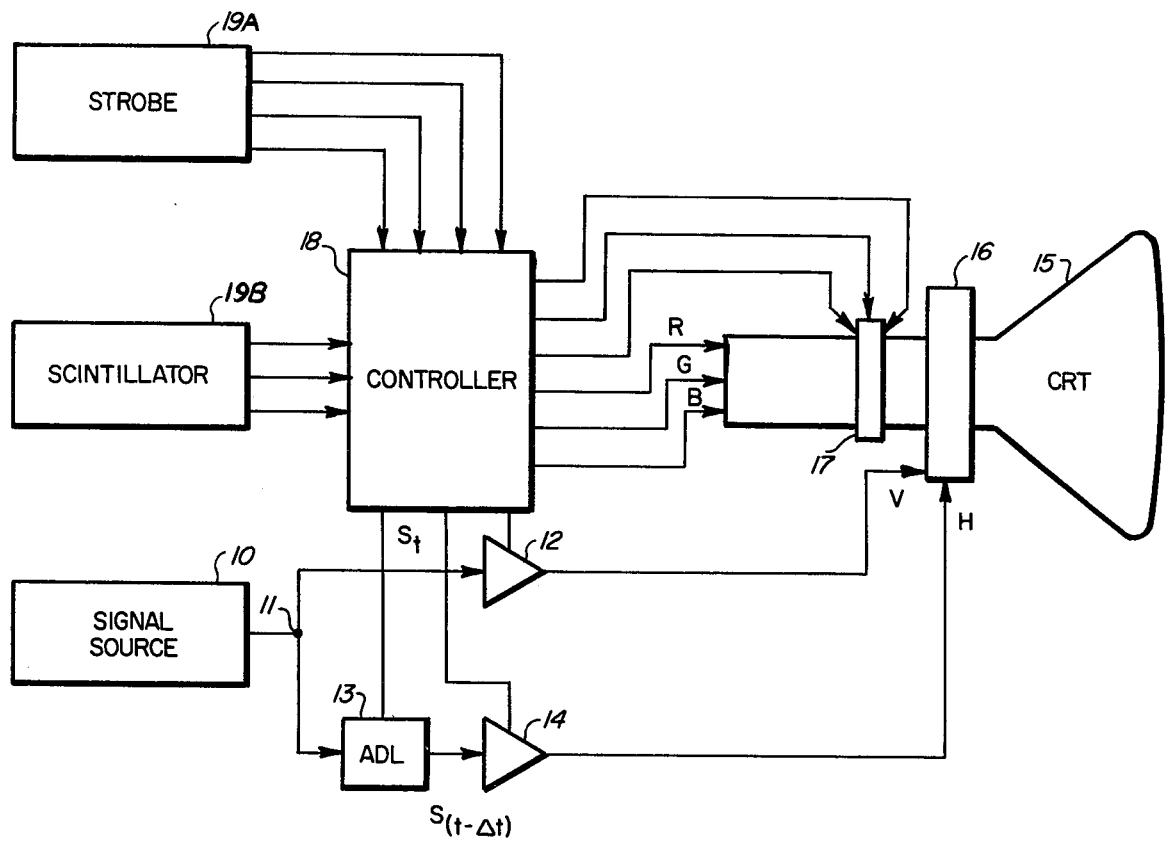
FIG. 1 is a block diagram of the display system which utilizes a single source of signals to achieve Lissajous pattern displays on a CRT and which system provides various intensity modulation effects to make the display more interesting and pleasing.

The theory by which a time delay may be utilized with a CRT so as to produce Lissajous patterns is fully disclosed in the subject co-pending application of the inventor herein and referenced above. The disclosure therein is incorporated here by reference, in its entirety. In summary, the disclosure there states that reentrant Lissajous figures may be formed on a cathode ray screen from a single source of signals if the signal is divided such that a part is passed directly to, say, the vertical deflection circuitry of the tube while the remaining part is passed through a time delay element and then, to, say, the horizontal deflection circuitry of the tube. If the signal source is providing output signals which are varying in frequency at a rate of change in frequency such that the time delay causes the presentation of signals of differing frequencies to be presented at any instant to the deflection circuits of the CRT, then a reentrant Lissajous figure will be formed. FIG. 1 herein illustrates the concept.

In FIG. 1, signal source 10 provides an output signal which varies in frequency, with time. The amplitude of the signal output by signal source 10 may also vary in amplitude, with time. The signal is divided at junction 11 so as to be fed simultaneously to vertical deflection amplifier 12 and analog digital delay line 13. The speed with which a signal travels through analog delay line 13 is determined by an associated clock circuit not shown in FIG. 1. By adjusting the rate at which the signal is clocked through delay line 13, the overall time delay through the delay line may be variably controlled. The output of delay line 13 is fed through horizontal deflection amplifier 14. The outputs of deflection amplifiers 12 and 14 are fed respectively to the vertical and the horizontal deflection circuits of CRT 15.

With the frequency of the signal out of signal source 10 varying at a rate whose period is shorter than the duration of the time delay introduced by analog delay line 13, it can be seen that the signal injected into the deflection amplifier 12 may be designated as $S_t$, wherein the "t" indicates that signal appearing at the input to amplifier 12 at the present time, t. At the same instant of time, the signal arriving at the input to amplifier 14 is designated as $S_{(t-\Delta t)}$ where "t-$\Delta t$" indicates that the signal presented at that instant at the input to amplifier 14 was output by signal source 10 at an earlier time, t-$\Delta t$; and $\Delta t$ is equal to the time delay introduced by analog delay line 13. It is thus seen that the signals arriving at the vertical and horizontal deflection circuits of CRT 15 consist of vertical and horizontal deflection signals of differing frequencies such that a reentrant Lissajous pattern will be formed on the screen of the CRT. Assuming that CRT 15 makes use of magnetic focusing and deflection, the deflection circuitry referred to earlier would comprise the well-known deflection yoke indicated as 16 in FIG. 1.

Deflection yoke 16 is conventionally placed in its normal operating position on the neck of CRT 15. When using a multiple electron-beam-gun tube having a multicolored phosphor screen, such as utilized in present day television sets, the retention of deflection yoke 16 in its normal operating position on the neck of CRT 15 results in each electron beam forming a pure color image on the screen of the CRT. In general, these images would be the primary red, green, and blue used in the additive mixing of colored lights to achieve secondary colors in pure hues. A secondary magnetic yoke 17 is also located on the neck of CRT 15 in essentially that position which would normally be occupied by convergence coils in a typical color TV system. Secondary yoke 17 is utilized to control the hue of the imagery drawn on the screen of the CRT by the actively deflected electron beams within the tube. Herein after, secondary yoke 17 may be referred to as "hue control 17".

Controller 18 is provided to permit the viewer to establish a display found most personally pleasing. Controls are here provided to set individual deflection amplifier gain, establish intensity modulation effects of the various electron beams within CRT 15, control the hue of the pure primary color patterns presented on the screen of said CRT, and to convert those patterns to multi-color displays. Strobe effect generator 19A and scintillation effect generator 19B permit controller 18 to imbue the display with psuedostroboscopic light and scintillation effects. The intensity modulation signals provided by strobe 19A and scintillator 19B are fed from controller 18 to the red, green, and blue grids of CRT 15. The hue control signals are fed from the controller 18 to hue control 17.

Figure 2:
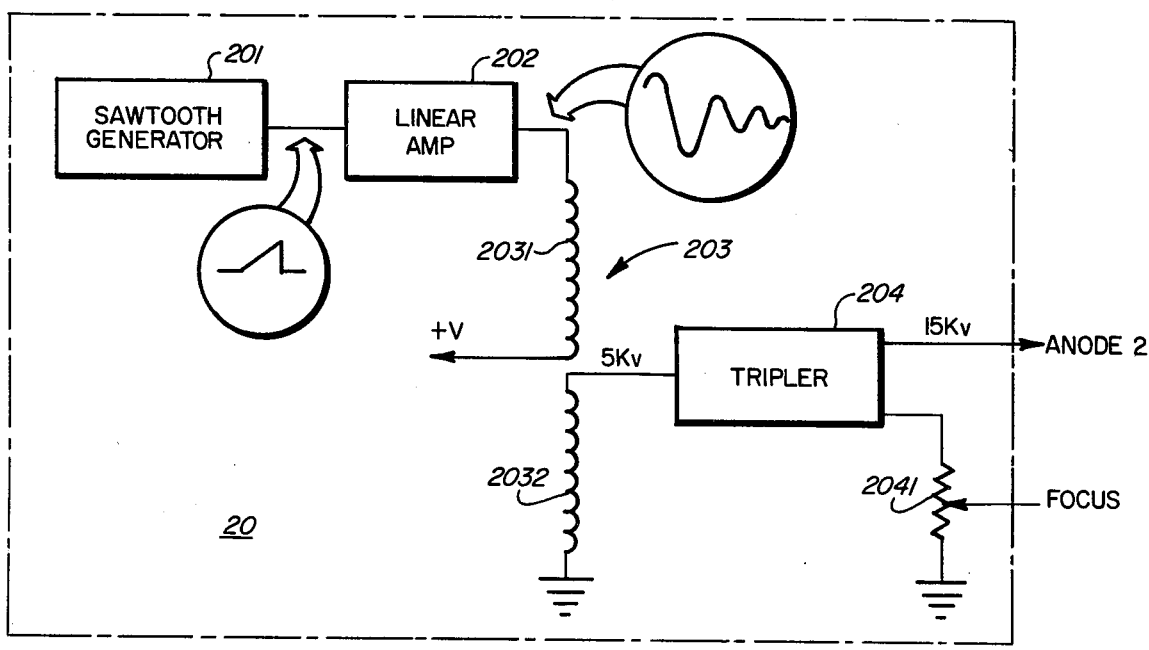
FIG. 2 illustrates a portion of the high voltage power supply illustrating the approach taken to providing a CRT display system which is essentially free of x-ray emission and EMI.

A power supply 20 provides the necessary voltages for use throughout the system. That part of power supply 20 which constitutes the high voltage source is indicated in FIG. 2. Sawtooth generator 201 drives linear amplifier 202 into the load presented by flyback transformer 203. The output of amplifier 202 working into the reactive load of transformer 203 produces a damped sinusoidal wave shape across transformer primary 2031. A secondary voltage of about 5 Kv is produced across secondary winding 2032. This voltage is tripled by tripler 204 and presented as a fifteen Kv potential to the accelerating anode of cathode ray tube 15. A lower level output of tripler 204 provides a potential of about six Kv such that the variable tap of potentiometer 2041 may raise the potential of the focusing anode to levels in the range of 3.6 to 6.0 Kv.

In conventional television sets, the flyback transformer is usually utilized in the deflection circuits. These voltages are extremely high and care is taken to preserve the sawtooth wave shape required for linear deflection of the electron beam during its raster scan. Sawtooth wave shapes are extremely rich in harmonic content and, because of the extremely high voltages involved, serious electro-magnetic interference (EMI) problems are encountered with the use of conventional television power supplies. In the present invention, the wave shape at flyback transformer 203 is a sinusoid having little or no harmonic content. Further, the voltage involved is only 5 Kv, extremely low by comparison with typical voltages encountered in television power supplies. Further, the accelerating anode of the present invention utilizes only fifteen Kv as compared to the 30 Kv or more potential applied to the accelerating anode of present day T.V. cathode ray tubes. Because of this, little or no x-ray emission is expected from the CRT utilized with the invention.

The overall power supply may be relatively inexpensive to produce since the need for filtering is not critical. Indeed, since the purpose of the system is to present an aesthetically pleasing visual display, power supply ripples of thirty percent or greater may actually contribute to the aesthetic appeal of the display presented to the viewer.

Before discussing the variety of visual effects available with use of the invention, it may be well to pause and differentiate the use of the terms "variegated color" as herein applied to devices such as those described in the Kratz et al patent, and the term "multi-color" as applied here to the present invention. Consider a simple ellipse as the pattern being viewed on the screen of the CRT. With variegated coloration, the color would change as the beam traverses the path of the ellipse such that in traversing the ellipse once, several color variations would occur. The line on the screen defining the ellipse might well be reminiscent of a piece of embroidery thread which goes through several variations of color as its length is traversed.

With the multi-color display of the present invention, two possible variations are available to the viewer. In one, the color tone of the pattern may be changed. Consider the simple ellipse discussed above; assume it was being illuminated by the blue gun of a conventional three color T.V. cathode ray tube. The invention provides means for adjusting the coloration of the pattern through shades of purple of varying degrees of color saturation. An analogous statement can be made with respect to the red and the green gun. A second effect is also available. Consider again a simple elliptic pattern of one color only, say, blue. The second effect available with the hue control is to produce a multiplicity of ellipses on the CRT screen, each of which is a distinctive shade of color different from that of the original pattern, which colored pattern continues to be presented to the viewer. The term, then, multi-color display, refers to the ability of the invention to present either of the above noted two effects.

Figure 3:
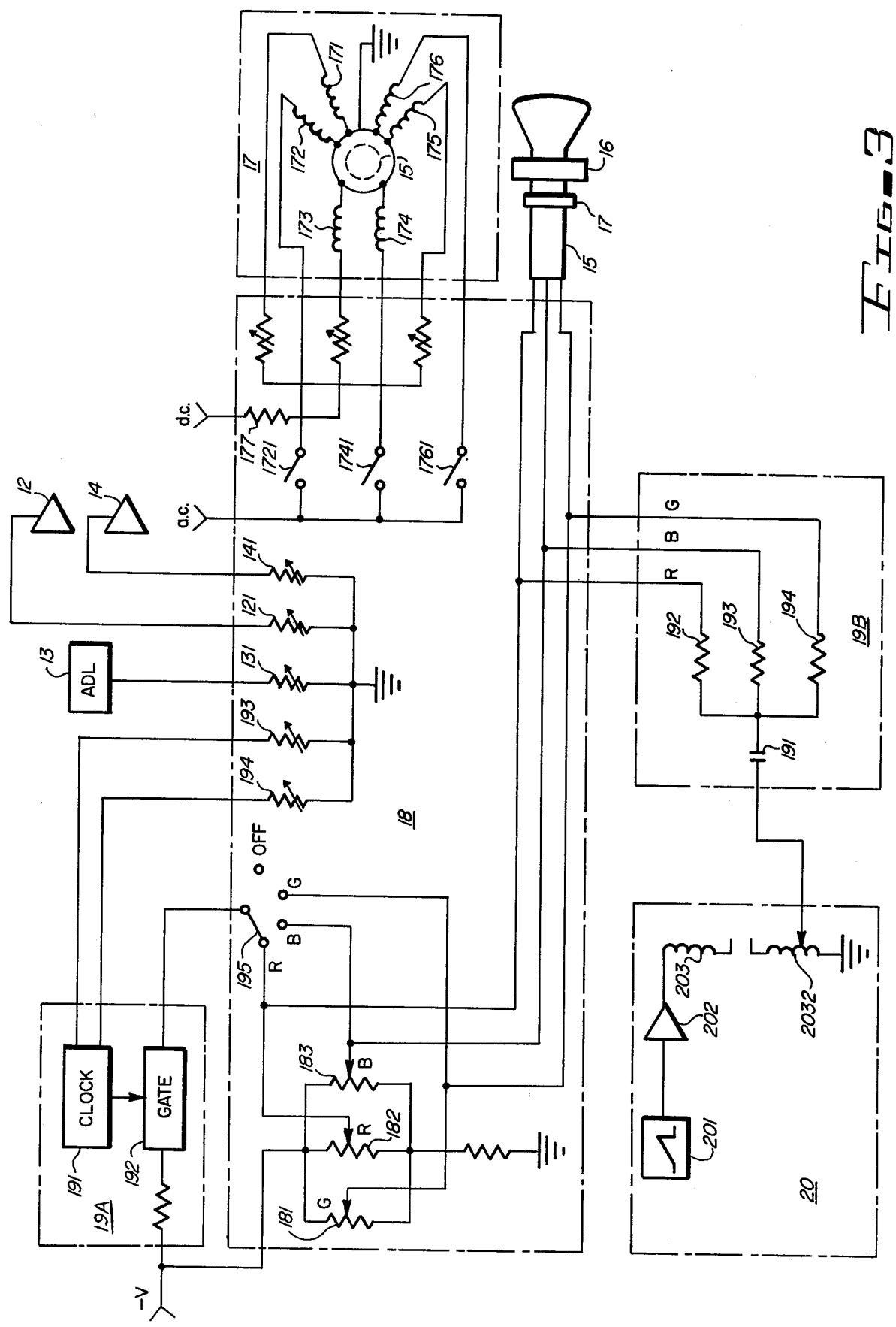
FIG. 3 depicts, in primarily a schematic fashion, the details by which the various intensity modulation effects are achieved as well as the means for controlling the hue of the Lissajous pattern formed on a color CRT.

In FIG. 3 are presented the means by which the visual display may be adjusted to suit the personal taste of the viewer. All the system controls are made conveniently available to the viewer on a control panel of controller 18. The means for obtaining the multi-coloration effects will be discussed first.

Hue control 17 is comprised of three pair of solenoid coils disposed about the neck of CRT 15 as indicated here in phantom view. A conventional convergence yoke assembly may be utilized to provide the hue control. To control the shade of the coloration of the Lissajous imagery, a dc source is connected to current limiting resistor 177. DC current from the source flows through limiting resistor 177 to junction 1771 from whence it is distributed to rheostats 1711, 1731, and 1751. Rheostat 1711 controls the flow of current through coil 171 of hue control 17. Rheostat 1731 controls the current through coil 173, and rheostat 1751 that through coil 175. Thus, the odd number coils of hue control 17 carry dc currents in varying amounts as established by the rheostat associated with each coil.

With no current flowing through the coils of hue control 17, the assembly is established on the neck of CRT 15 in the approximate position usually occupied by the convergence yoke assembly on a T.V. cathode ray tube. The coil is rotated to a position which permits the display of a pure color from each of the guns within the conventional three color T.V. display tube. This adjustment is necessary to overcome the effect of any residual magnetisim in the assembly. With dc voltage applied, the action of rheostat 1711 and coil 171 on the beam will be described. Adjusting the flow of dc current through coil 171 effects the convergence of one of the color guns within the tube. The effect is such that the coloration of the image presented by that gun will change to a different colored hue which may then be controllably varied, by operation of rheostat 1711, in saturation as the shade is lightened toward white. For example, if coil 171 is effecting the convergence of the blue electron beam, energizing coil 171 will cause the blue display to shift toward purple. Increasing the current flow through the coil carries the beam through lavender toward white.

Assuming that coil 173 is controlling the red electron beam, application of dc to coil 173 shifts the beam toward orange, through gold, toward white as the current is controlled by rheostat 1731. In the experiments performed in reducing the invention to practice, control of the green gun, as might be suggested by FIG. 3 using coil 175 and rheostat 1751, resulted in a controlled variation in the shade of the green display presented without shifting the beam to a secondary color. This was thought to be caused by the physical geometry of the electron gun assembly within the tube.

In utilizing coloration controls 1711, 1731, and 1751, some interaction among control settings is noted. Far from being a detractive feature, this slight interaction merely adds to the variety of coloration effects which may be achieved on the face of the CRT. The even numbered coils 172, 174, and 176 of hue control 17 are connected through switches 1721, 1741, and 1761 to an alternating current source. These switches permit the selective application of an ac field to a given color gun so as to cause the electron beam to deflect alternately to either side of that path it would follow for its originally established convergence path. If the frequency of the deflection signals applied to deflection yoke 16 are reasonably high in comparison with the frequency of alternation of the current through one of the even numbered coils of hue control 17, then several sweep patterns will present themselves on the CRT screen. The color consistency of each sweep will be reasonably constant and of a different shade of color in each of the patterns presented. The multiple patterns will be displaced slightly from each other presenting one with the impression of a 3-D display.

The ac applied to the subject coils also causes a slight defocusing of the beam as the beam is displaced from its established convergence path. This produces a variation in the width of the trace on the phosphorescent screen of the CRT, further enhancing the 3-D quality of the presentation.

It should be noted that this multiple-coloration effect is achieved even though only one of the three color guns is operative. Thus, color control 17 could be utilized with a single gun, multi-color phosphor CRT. Switches 1721, 1741, and 1761 permit the selected application of ac current through any one or more of the three even numbered coils of hue control 17. Use of these switches gives the viewer an opportunity to increase the number of patterns displayed on the screen as well as injecting a greater variety of color in the presentation than would be ordinarily be present without the ac exertation of the coils of hue control 17. This feature may be highly desirable in the instance, for example, where the display being presented is derived from a signal generated by the sound of a single musical instrument.

Controller 18 also makes available to the viewer the means for controlling the gain of deflection amplifiers 12 and 14 by means of gain controls 121 and 141 respectively. Since a Lissajous pattern is generated as the resultant deflection force created on the electron beam, and that force varies with the strength of the signal in each deflection circuit, the shape of the Lissajous pattern presented may be controlled in the manner in which the drive signal is applied to each deflection circuit.

If the transit time delay of the one part of the deflection signal through analog delay line 13 is insignificant in comparison with the rate of change of frequency of the signal provided by the single signal source, then the Lissajous pattern presentation on the scope will be relatively simple elliptic patterns. If the delay of delay element 13 is increased with respect to the rate of change of frequency of the incoming signals, then the time delay introduced by delay 13 will be sufficient to assure that the deflection of the beam is the instantaneous resultant of deflection signals of differing frequencies. This latter condition assures that the Lissajous patterns resulting on the screen will be the more involved and interesting reentrant type of figure. To assure this latter result, timing control 131 is made available in controller 18 as a means of controlling the frequency of the clock associated with analogue delay line 13. Control 131 will establish the rate at which the deflection signal is clocked through delay line 13 and thereby establish the time differential between deflection signals necessary to reasonably assure the presence of deflection signals of differing frequencies being instantaneously presented to each of the deflection circuits.

The introduction of stroboscopic lighting effects to the accompaniment of dance music has met with popular acceptance. To provide a pseudostroboscopic effect, the invention herein utilizes strobe effect generator 19A. Strobe generator 19A consists of the clock-gated application of a blanking voltage to a selected electron beam within the CRT. In FIG. 3, blanking voltage $-V$ is applied to the selected electron beam through gate 192. The voltage is gated through gate 192 by clock 191. If clock 192 utilizes, say, circuitry similar to the familiar integrated circuit 555 timer, both its repetition rate and its duty cycle may be controlled as suggested by controls 193 and 194. That is, both the frequency of application of the blanking signal to the electron beam and the duration of each application may be controlled by the viewer using controls 193 and 194.

Blanking voltage $-V$ could be gated through all three guns simultaneiously if desired. However, this is not the preferred mode of operation and for aesthetic reasons, it was deemed more appropriate to selectively strobe only one of the three beams at any given time. To permit this selectivity, switch 195 is provided to select the color grid controlling the beam chosen to be strobed. Switch 195 is a single-pole multithrow switch dependent upon the number of electron beam guns within the CRT utilized with the invention. In the present embodiment, switch 195 is shown as a single pole quadruple throw switch permitting selection of none or any one of the three color grids; red, blue, or green, of the CRT.

The intensity of the individual beams in the multi gun CRT 15 is controlled by potentiometers 181 for the green beam, 182 for the red beam, and 183 for the blue beam. These potentiometers permit their associated color grids to be lowered to the blanking level of $-V$ volts (on the order of $-150$ V) or raised to a ground potential for a full intensity presentation.

A scintillation generator 19B is provided to add additional visual interest to the patterns displayed on the CRT screen. Scintillation is a form of intensity modulation obtained by sampling the energy in the secondary winding 2032 of flyback transformer 203 in power supply 20. The sample is obtained from a tap near the grounded end of secondary 2032. Capacitor 191 conveys the sample through resistors 192, 193 and 194 to the red, blue, and green control grids respectively of CRT 15. The RC path-impedance is chosen to match the impedence measured between the secondary sampling tap and ground, for greatest energy transfer efficiency.

Within the useful frequency limits of flyback transformer 203, control of the frequency of the output of sawtooth generator 201 as well as of the exact wave shape characteristics of the output of that generator, will establish the wave shape of the voltage sampled for scintillation of the beams. It is herein suggested that the performance of sawtooth generator 201 be adjusted so as to provide an asymmetrical wave shape at the sampling tap of transformer secondary 2032. It is further suggested that the positive-going portion of the sampled wave shape be of shorter duration than the negative part of the wave shape. These suggestions are made for aesthetic reasons and may represent personal taste only. However, the suggestion is made after viewing scintillation effects derived with sampling signals asymmetric in the other extreme as well as those produced by balanced wave shapes. In any event, it is well to note that the scintillation effect may be varied and it would be within the realm of possibility to provide a front panel control in controller 18 to affect the performance characteristics of sawtooth generator 201 to provide such a variation in scintillation.

The frequencies under consideration here for use with the flyback transformer 203 are on the order of 30 kHz. With the flyback transformer operating at this frequency, no annoying high-pitched squeel is noticeable when the invention is in use. This is another advantageous feature of the invention's power supply compared with the power supply employed in today's television sets.

It will be enlightening to discuss the operation of the intensity controls and their effect on the display. Since the discussion immediately following will be applicable to all beams in the electron tube, the blue beam will be chosen as a matter of convenience for purposes of exposition. Although the magnitudes are not critical it will be assumed, for example, that the magnitude of the blanking voltage $-V$ is $-150$ volts and the scintillation signal has a maximum peak-to-peak value of 200 volts, which decays with time. Let all three intensity controls, 181, 182, and 183, be adjusted so as to apply the full blanking voltage $-V$ to their respective grids in CRT 15.

With signal source 10 applying a signal to the display system, let potentiometer 183 be adjusted away from $-V$ toward ground. As pot 183 is slowly advanced towards ground, the first visual effect is that of a coruscating display of blue colored lights along the path described by the electron beam as it strikes the phosphorescent screen. Continuing to advance the pot control changes the coruscating display to one of twinkling segments having definable lengths, each with discernible wave shapes present along each length, that shape being somewhat suggestive of a triangle.

As pot 183 continues its advancement, the length of each twinkling segment increases while the degree of scintillation becomes reduced. Further advancement of the pot causes the segments to increase to such length that they form a continuous unbroken Lissajous pattern and no scintillation of the figure is noted by the viewer. At this point, the drive on the grid of the color gun is so positive in nature that the modulation from scintillation generator 19B is no longer effective and the color pattern presented will be a closed Lissajous figure of steady intensity.

If at this point in time, switch 195 is set to pass the gated blanking voltage to the blue grid of CRT 15, the viewer will perceive two effects. The first will be an apparent change in the shape of the pattern formed on the screen. The second will be a strobe-like variation in the intensity of the pattern displayed. While the strobe-like variation in intensity is to be expected, the change in shape of the Lissajous figure requires further explanation. The effect is thought to be caused by the fact that during the blanked portion of the sweep, the screen does not phosphoresce. Since the gated blanking signal and the sweep are not synchronized. The points at which the beam is blanked at on one sweep do not coincide exactly with those segments of the sweep blanked on a later sweep. A composite pattern is thus constructed which is determined by the relationship between the frequencies at which the sweep is generated and that at which the blanking is gated to the sweep.

As pot 183 is drawn closer to ground, the strobing effect diminishes until, when the beam is at full intensity, no strobing effect will be noted by the viewer. If the control arm of pot 183 is now returned towards the $-V$ potential, a point is soon reached at which the pattern presented is both strobed and scintillated.

The combinations in which the controls of controller 18 may be established are literally unlimited. For example, if one beam is set to present a scintillating pattern, the second beam a solid color presentation, and the third beam a strobed image, the effect is quite pleasing. If hue control 17 is now utilized so as to provide an ac signal to the coil which affects the beam being scintillated, then a coruscating display of star-like points of light will appear to move about and through the imagery created by the other two beams. Because the strobed beam is a composite pattern, its shape differs from that of the remaining beam which is being neither strobed nor scintillated. The color tone of both the strobed beam and the constant intensity beam may be individually established by adjustment of the rheostat associated with their dc-energized coils in hue control 17. Alternately, an ac signal may be applied to either the constant intensity beam or to the strobed beam which will produce a series of patterns, each of different color tones and with slight variations in trace width about the beam controlled by the coil so energized within color controller 17. It is believed that the invention provides a color display of such inifinite variety, easily controlled at the whim of the viewer, that it is without peer in its art field.

The term "pseudostroboscopic" effect has been used herein to distinguish the display from the high-intensity, short duration light pulses emmitted by so-called stroboscopes, strobotrons and devices of similar characteristics. However, the effect of practicing the invention herein is to produce a truly stroboscopic effect on the motion of objects illuminated by the display and the motion of the object being apparently slowed or made to appear motionless. In the broadest sense of the word, the strobed display taught herein is stroboscopic in nature.

The teachings herein establish the method and means for providing an aesthetically pleasing color display on a multi color cathode ray tube of signals derived from a single source and, further, providing means and method for achieving multi color effects, controlling pattern shape, and providing stroboscopic and scintillation effects to the display imagery, all in an easily controlled and selectable manner.

Having described my invention in such a clear and concise manner that those skilled in the art may easily and simply practice it and having set forth a presently preferred embodiment of the invention, I, therefore, claim:

1. A display system using a single source of signals to achieve aesthetically pleasing Lissajous patterns on a multi-color phosphor screen of a color cathode ray tube (CRT), said CRT having the necessary associated power supply and first and second deflection means to provide an intensity controlled, visually discernible image on said screen in response to signals applied to said first and second deflection means comprising:
   (a) means for inputting a signal from a single source into said display system;
   (b) means for communicating said signal directly to first deflection means of a multi-color phosphor CRT, and through
   (c) time delay means to second deflection means of said CRT;
   whereby Lissajous figures are formed on the screen of said CRT, and:
   (d) hue control deflection means for establishing the color tone of the Lissajous figures displayed.

2. The display system of claim 1 further including means for intensity modulation of an electron beam in said CRT.

3. The display system of claim 1 in which the transit time of said signal through said time delay is selectably variable.

4. In the display system of claim 1 further including means for intensity modulating said discernible image so as to produce a stroboscopic effect comprising:
   (a) a blanking voltage source;
   (b) means for gating blanking voltage from said voltage source to a beam control grid of said CRT;
   (c) clock means for controlling said means for gating said blanking voltage.

5. In the display system of claim 4 means for selectably controlling the repetition frequency and the duty cycle of said clock means.

6. In the display system of claim 1 means for intensity modulating said discernible image so as to produce scintillation of said image comprising:
   (a) a signal source outputting a scintillation signal having a peak-to-peak amplitude of such magnitude that said signal when applied to the control grid of a nominally blanked electron beam of said CRT will just un-blank said beam at the maximum positive excursion of said signal;
   (b) means for supplying said scintillation signal to said control grid of said CRT;
   (c) means for selectably controlling the magnitude of the voltage used to provide nominal blanking of said electron beam such that said electron beam is controllably un-blanked for progressively greater portions of the period of said scintillation signal said means for selectably controlling the magnitude of said voltage being reversible in its operation.

7. The display system of claim 6 in which the signal source outputting said scintillation signal is a flyback transformer in the power supply associated with said CRT.

8. The display system of claim 1 in which the hue control deflection means for establishing the color tone of the Lissajous figures displayed comprises:
   (a) tertiary deflection means located on the envelope of a multi color CRT so as to affect the path of an electron beam within said CRT prior to said beam's entering the region along its path affected by the first and second deflection means of said CRT;
   (b) a source of hue control signals;
   (c) means for communicating said hue control signals from said source to said tertiary deflection means.

9. The display system of claim 8 in which said source of hue control signals is a direct current (dc) source.

10. The display system of claim 8 in which said source of hue control signals is an alternating current (ac) source.

11. The display system of claim 8 in which said tertiary deflection means is comprised of two juxtaposed deflection coils, one of which is energized by ac hue control signals, the other of which is energized by dc hue control signals.

12. The tertiary deflection means of claim 8 comprising a conventional color CRT convergence yoke.

13. In a display system providing visual imagery on the screen of a cathode ray tube (CRT) said CRT having the necessary associated power supply and deflection means to yield an intensity controlled, visually discernible image in response to deflection signals supplied to said deflection means, means for intensity modulating said discernible image so as to produce scintillation of said image comprising:
   (a) a signal source outputting a scintillation signal having a peak-to-peak amplitude of such magnitude that said signal when applied to the control grid of a nominally blanked electron beam of said CRT will just un-blank said beam at the maximum positive excursion of said signal;
   (b) means for applying said scintillation signal to said control grid of said CRT;
   (c) means for selectably controlling the magnitude of the voltage used to provide nominal blanking of said electron beam such that said electron beam is controllably unblanked for progressively greater portions of the period of said scintillation signal said means for selectably controlling the magnitude of said voltage being reversible in its operation.

14. The display system of claim 13 in which the signal source outputting said scintillation signal is a flyback transformer in the power supply associated with said CRT.

15. In a display system providing visual imagery on a multi color phosphor screen of a color cathode ray tube (CRT) having the necessary associated power supply and primary deflection means to yield an intensity controlled visually discernible image in response to deflection signals supplied to said deflection means secondary means for controlling said deflection to affect color tone of said image in response to hue control signals comprising:
   (a) secondary deflection means located on the envelope of a multi color CRT so as to affect the path of an electron beam within said CRT prior to said beam's entering the region along its path affected by the primary deflection means of said CRT;
   (b) a source of hue control signals;
   (c) means for communicating said hue control signals from said source to said secondary deflection means.

16. The display system of claim 15 in which said source of hue control signals is a direct current (dc) source.

17. The display system of claim 15 in which said source of hue control signals is an alternating current (ac) source.

18. The display system of claim 15 in which said secondary deflection means is comprised of two juxtaposed deflection coils, one of which is energized by ac hue control signals, the other of which is energized by dc hue control signals.

19. The secondary deflection means of claim 15 comprising a conventional color CRT convergence yoke.

* * * * *